(12) United States Patent
Flores et al.

(10) Patent No.: US 11,442,857 B2
(45) Date of Patent: *Sep. 13, 2022

(54) DYNAMIC CACHING AND EVICTION POLICY IN DIFFERENT POINTS-OF-PRESENCE OF A CONTENT DELIVERY NETWORK

(71) Applicant: Verizon Digital Media Services Inc., Dulles, VA (US)

(72) Inventors: Marcel Eric Schechner Flores, Los Angeles, CA (US); Derrick Sawyer, Santa Clarita, CA (US)

(73) Assignee: Edgecast Inc., Dulles, VA (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/216,281

(22) Filed: Mar. 29, 2021

(65) Prior Publication Data

US 2021/0216456 A1 Jul. 15, 2021

Related U.S. Application Data

(63) Continuation of application No. 16/200,153, filed on Nov. 26, 2018, now Pat. No. 10,963,381.

(51) Int. Cl.
*G06F 12/0813* (2016.01)
*G06F 12/0871* (2016.01)
(Continued)

(52) U.S. Cl.
CPC ...... *G06F 12/0813* (2013.01); *G06F 11/3485* (2013.01); *G06F 12/0871* (2013.01);
(Continued)

(58) Field of Classification Search
CPC ............. G06F 12/0813; G06F 11/3485; G06F 12/0871; G06F 17/18; G06F 16/9574;
(Continued)

(56) References Cited

U.S. PATENT DOCUMENTS 8,583,763 B1 * 11/2013 Kim .................. G06F 21/10
709/218
2003/0115281 A1 * 6/2003 McHenry ............ H04L 67/2895
709/213
(Continued)

OTHER PUBLICATIONS

Berger et al., "AdaptSize: Orchestrating the Hot Object Memory Cache in a Content Delivery Network", 14th USENIX Symposium on Networked Systems Design and Implementation, Apr. 9, 2018, 16 pages.

*Primary Examiner* — Charles Rones
*Assistant Examiner* — Hewy H Li
(74) *Attorney, Agent, or Firm* — Ansari Katiraei LLP; Arman Katiraei; Sadiq Ansari

(57) ABSTRACT

Dynamic caching policies and/or dynamic purging policies are provided for modifying the entry and eviction of content to the cache (e.g., storage and/or memory) of a caching server based on the current and past cache performance and/or demand. The caching server may modify or replace a configured policy when cache performance is below one or more thresholds. Modifying the caching policy may change caching behavior of the caching server by changing the conditions that control the content that is entered into cache or the content that is deferred and not entered into cache after a request. This may include assigning different probabilities for entering the same content into cache based on different caching policies. Modifying the purging policy may change eviction behavior of the caching server by changing the conditions that control the cached content that is selected and removed from cache.

18 Claims, 8 Drawing Sheets

(51) Int. Cl.
  *H04L 67/1097* (2022.01)
  *G06F 11/34* (2006.01)
  *G06F 16/957* (2019.01)
  *G06F 17/18* (2006.01)

(52) U.S. Cl.
  CPC .......... *G06F 17/18* (2013.01); *H04L 67/1097* (2013.01); *G06F 16/9574* (2019.01)

(58) Field of Classification Search
  CPC . G06F 16/957; H04L 67/1097; H04L 67/568; H04L 43/0876; H04L 43/0882; H04L 43/0888; H04L 43/0894; H04L 67/5682
  See application file for complete search history.

(56) References Cited

U.S. PATENT DOCUMENTS

| | | |
|---|---|---|
| 2004/0054860 A1 | 3/2004 | Dixit et al. |
| 2004/0117441 A1 | 6/2004 | Liu et al. |
| 2011/0047317 A1* | 2/2011 | Burkard ................ G06F 12/123 711/138 |
| 2012/0159558 A1* | 6/2012 | Whyte ................ H04N 21/222 725/95 |
| 2013/0185475 A1 | 7/2013 | Talagala et al. |
| 2015/0350365 A1 | 12/2015 | Khakpour et al. |
| 2016/0306895 A1 | 10/2016 | Kaewell et al. |

\* cited by examiner

DYNAMIC CACHING AND EVICTION POLICY IN DIFFERENT POINTS-OF-PRESENCE OF A CONTENT DELIVERY NETWORK

CLAIM OF BENEFIT TO RELATED APPLICATIONS

This application is a continuation of U.S. nonprovisional application Ser. No. 16/200,153 entitled "Dynamic Caching and Eviction", filed on Nov. 26, 2018, now U.S. Pat. No. 10,963,381. The contents of application Ser. No. 16/200,153 are hereby incorporated by reference.

BACKGROUND ART

A caching server and/or a group of caching servers may be deployed at different network locations to accelerate the distribution of content, services, and/or data to requesting clients in neighboring geographic regions and/or network service regions. The caching servers may use a static caching policy, such as second-hit caching, to fill the cache, and a static purging policy, such as Least Recently Used ("LRU") or Least Frequently Used ("LFU"), to remove content from the cache.

Static caching policies and/or static purging policies may be ideal for managing a large cache (e.g., terabytes worth of storage), and/or managing a cache that experiences a low request volume. In particular, static caching and/or purging policies, when used to manage a large cache, may result in a sufficiently high cache-hit ratio and/or cache performance because of their sheer size. For instance, by the time the large cache is filled and content has to be evicted, there is a high likelihood that the purged content is no longer needed in cache because the purged content has become obsolete, is requested less frequently, or has been updated with newer content. A large cache may be provided by a single caching server, or may be formed from the collective caches of a group of interoperating caching servers.

The same static caching and/or purging policies may not be ideal for managing a small cache and/or a cache that experiences a high request volume. In such cases, the static caching policy may fill the cache too quickly, causing earlier cached content to be evicted too quickly by the static purging policies before demand for the evicted content subsides. Accordingly, the static caching and/or purging policies may lead to a low cache-hit ratio and/or poor cache performance, because the contents of the cache are replaced too frequently due to the small cache size and/or high request volume. The static operation of the static caching and/or purging policies also prevents the cache from adapting to changes in the request stream and/or client demand.

DETAILED DESCRIPTION

Figure 1:
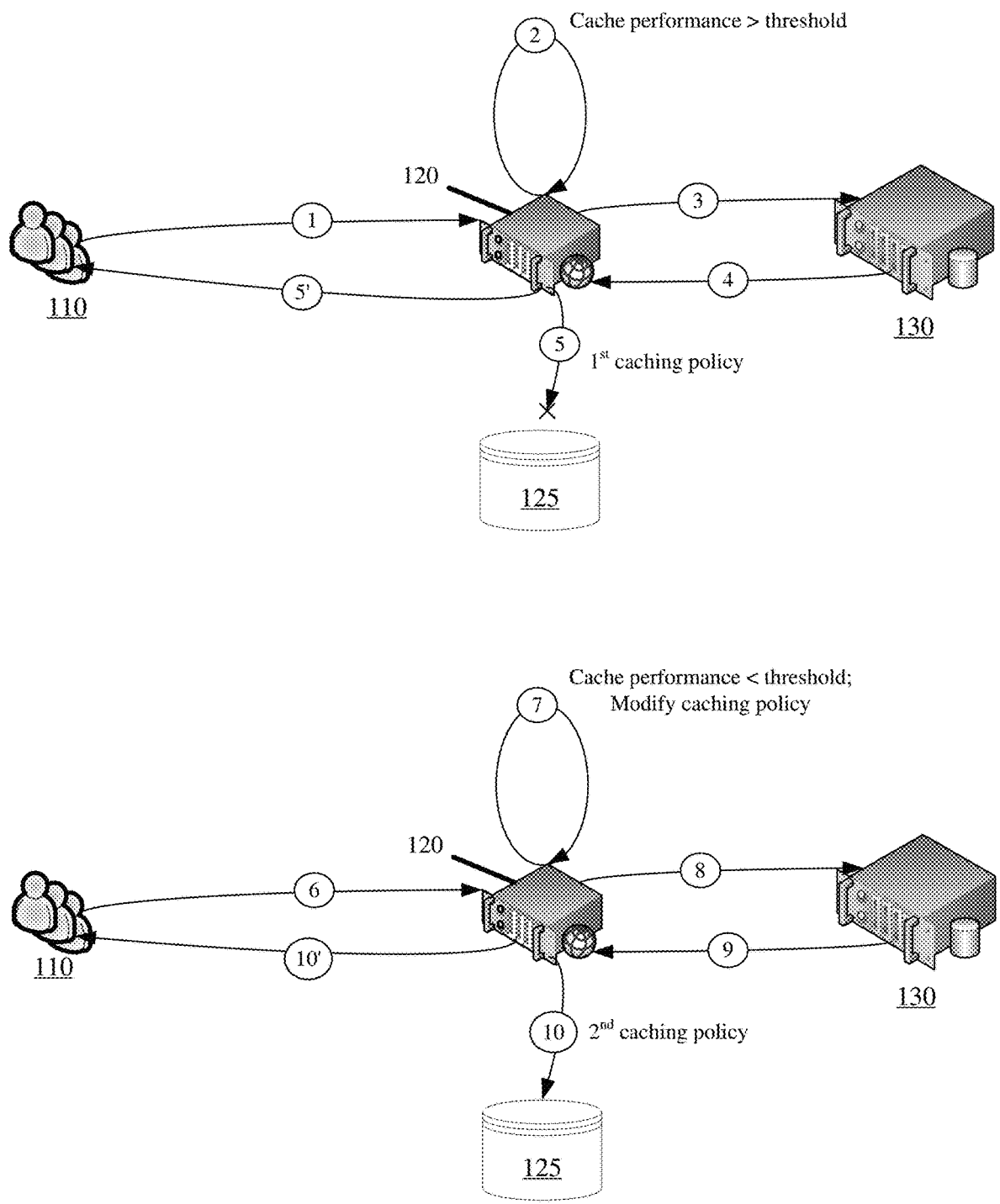
FIG. 1 illustrates an example for dynamically modifying the caching policy of a caching server in accordance with some embodiments described herein.

The following detailed description refers to the accompanying drawings. The same reference numbers in different drawings may identify the same or similar elements.

Systems and/or methods, as described herein, may provide dynamic caching policies and/or dynamic purging policies for modifying the entry and eviction of content, files, and/or data (hereinafter collectively referred to as "content") to the cache of a caching server or a collective cache formed by a set of caching servers based on the current and past cache performance and/or demand. In some embodiments, a caching server may continually modify a configured caching policy when cache performance is below one or more thresholds. Modifying the caching policy may change caching behavior of the caching server by changing the conditions that control the content that is entered into cache or the content that is deferred and not entered into cache after a request. In some embodiments, the caching server may continually modify a configured purging policy when cache performance is below one or more thresholds. Modifying the purging policy may change eviction behavior of the caching server by changing the conditions that control the cached content that is selected and removed from cache.

The dynamic modification of the caching and/or purging policies is performed to improve cache performance of the caching server. In particular, the caching server dynamically modifies the caching and/or purging policies to maximize the cache-hit rate (e.g., minimize cache misses) while simultaneously minimizing the number of cache deferrals (e.g., cache misses that do not result in new content being entered into cache).

In some embodiments, the performance thresholds for determining when to change the caching and/or purging policies of a caching server may be based on one or more of the cache-hit ratio experienced by that caching server, the bytes per second served from cache relative to the bytes per second served from deferrals (e.g., cache misses), rate of disk writes, and/or other metrics related to the speed with which the caching servers can respond to client requests, and/or other parameters related to requested, retrieved, and/or cached content. Examples of some such metrics may include latency, number of cache deferrals (e.g., requested and/or retrieved content that is not cached), cache misses, origin retrievals, and cache utilization. For instance, the bytes per second served from cache being some percentage less than the bytes per second served from deferrals may be a first trigger for modifying a caching policy of a caching server, and average response latency that is greater than a latency threshold may be a second trigger for modifying the caching policy and/or the purging of the caching server.

In some embodiments, the thresholds may be based on metrics compiled from a set of caching servers that operate to form a collective cache, and the policy changes may be performed in response to the thresholds for the set of caching servers. In some such embodiments, each caching server of the set of caching servers may independently change its caching and/or purging policies separately from other caching servers in the set of caching servers. In some other embodiments, the set of caching servers may coordinate caching and/or purging operation based on meta-policies. Changing a meta-policy may cause the same caching and/or purging change at each caching server in the set of caching servers.

In some embodiments, dynamically modifying the caching policy of a caching server or a set of caching servers may include switching from a first caching policy to an altogether different second caching policy. For instance, a caching server may use second-hit caching as a first caching policy for a first time during which the caching server caches content after a second request for that content is received within a particular time interval. The caching server may then switch from the first caching policy to a second caching policy for a subsequent second time during which the caching server caches content that includes specific cache keys in the header and/or request Uniform Resource Locator ("URL") irrespective of the number of the times the content is requested in the particular time interval.

Similarly, dynamically modifying the purging policy of a caching server or a set of caching servers may include switching from a first purging policy to an altogether different purging policy. For instance, a caching server may use a Least Recently Used ("LRU") purging policy to select and remove content from cache during a first time, and may switch to a Least Frequently Used ("LFU") purging policy to select and remove content from caching during a second time.

In some embodiments, dynamically modifying the caching policy of a caching server or a set of caching servers may include altering behavior of a configured caching policy. For instance, a caching server may use a second-hit caching policy to enter content into cache during a first time, and may use a modified second-hit caching policy to enter content into cache during a second time, wherein the modified second-hit caching policy may cache with a first probability, first content of a first type (e.g., streaming content) after two requests for that first content in a particular time interval, and may cache with a lesser second probability, second content of a second type (e.g., images and/or website content) after two requests for that second content in the particular time interval.

Similarly, dynamically modifying the purging policy of a caching server or a set of caching servers may include altering behavior of a configured purging policy. For instance, a caching server may use LRU to evict content from cache and may age each item of cached content at the same rate during a first time, and may age different cached content at different rates during a second time. For instance, a first set of files or content (e.g., news content) may be aged more quickly than a second set of files or content (e.g., movies), thereby accelerating the removal of the first set of files from cache even though the first set of files may receive request rates that are about equal to the request rates of the second set of content.

The caching servers may use artificial intelligence or machine intelligence to determine the policy changes that can improve cache performance based on current and past cache performance and/or demand. For instance, a first caching policy and/or first caching policy behavior modification may result in a higher cache-hit ratio when requests, received during a first time, are directed primarily to a first type of content, and a second caching policy and/or second caching policy behavior modification may result in a higher cache-hit ratio when requests, received during a subsequent second time, are directed primarily to a second type of content. The requests may change from the first type of content to the second type of content based on the time of day, active clients, daily events, and/or other reasons.

The dynamic modifications to the caching and/or purging policies of the caching servers may be made in response to cache performance of the caching servers falling below one or more performance thresholds. As noted above, cache performance may be quantified in terms of a cache-hit ratio, latency, number of cache deferrals (e.g., requested and/or retrieved content that is not cached), cache misses, origin retrievals, cache utilization, the speed with which the caching servers can respond to client requests, and/or other parameters related to requested, retrieved, and/or cached content.

FIG. 1 illustrates an example for dynamically modifying the caching policy of a caching server in accordance with some embodiments described herein. As shown, FIG. 1 illustrates operation between client devices 110, dynamic caching server 120, and origin storage 130.

Dynamic caching server 120 may include cache 125. Cache 125 may be memory and/or storage for retaining content that is retrieved from origin storage 130, and/or that is served to client devices 110 in response to requests received from client devices 110.

Origin storage 130 may represent a second-tier cache and/or storage of a content delivery network ("CDN") that distributes customer content to different caching servers (e.g., dynamic caching server 120) of the CDN. In some embodiments, origin storage 130 may be operated by a different entity than dynamic caching server 120. For instance, origin storage 130 may be operated by a content provider, and dynamic caching server 120 may be operated by a CDN. Although FIG. 1 illustrates dynamic caching server 120 communicating with a single origin storage 130, dynamic caching server 120 may communicate with different origin storages 130 that are distributed across a data network. Dynamic caching server 120 may communicate with different origin storages 130 in order to request and retrieve different content for distribution to client devices 110 and/or for caching.

Client devices 110 may represent any network-enabled device that requests and/or receives content over a data network. Client devices 110 may include desktop computer, laptop computers, tablet computing devices, smartphones, set-top boxes, Internet-of-Things ("IoT") devices, sensors, and/or other devices.

As shown in FIG. 1, client devices 110 may issue (at 1) a first request for first content that is routed to dynamic caching server 120. The first request may include a URL that identifies the first content being requested. The first request may be a HyperText Transfer Protocol ("HTTP") GET message, HTTP POST message, and/or other network message that is used to request content from dynamic caching server 120.

Dynamic caching server 120 may determine that the first content is not stored in cache 125 based on a hash of the first request URL and/or other lookup. Dynamic caching server 120 may also determine (at 2) that the performance of cache 125 satisfies a performance threshold. Accordingly, no change is made to a first caching policy that is used by dynamic caching server 120 to store retrieved content in cache 125. In some embodiments, dynamic caching server 120 may have a monitoring module that continually monitors different cache metrics that relate to the performance of cache 125. For instance, dynamic caching server 120 may monitor the cache-hit ratio, response latency, number of cache deferrals, cache misses, origin retrievals, cache utilization, and/or other metrics in order to determine that the cache performance satisfies the performance threshold.

In response to determining that the first content is not in cache 125, dynamic caching server 120 may forward (at 3) a request for the first content to origin storage 130. In some embodiments, dynamic caching server 120 may identify origin storage 130 as a source of the first content from the request URL, or may be configured to use origin storage 130 as a second-tier cache for requested content that is not in cache 125.

Dynamic caching server 120 may retrieve (at 4) the first content from origin storage 130 in response to the forwarded request to origin storage 130. In retrieving the first content from origin storage 130, dynamic caching server 120 obtains various information about the first content (e.g., content type, file size, content provider, etc.).

Dynamic caching server 120 may then use the unmodified first caching policy and/or the obtained information about the first content to determine (at 5) whether or not to store the first content in cache 125. In particular, the unmodified first caching policy may include a first set of conditions by which dynamic caching server 120 makes the determination as to whether the first content is stored in cache 125. For example, the unmodified first caching policy may be a second-hit caching policy, and dynamic caching server 120 may store the first content to cache 125 when the first content was requested at least once before in a current time interval. As shown, dynamic caching server 120 does not enter (at 5) the first content into cache 125 based on the decision that is made using the first caching policy. Dynamic caching server 120 may distribute (at 5') the first content to client devices 110 contemporaneous with determining (at 5) whether to store the first content in cache 125.

Client devices 110 may then issue (at 6) a second request for second content that is routed to dynamic caching server 120. In some embodiments, the second content may be the same as the first content or may be different content (e.g., a different content, file, and/or data). Dynamic caching server 120 may determine that the second content is not stored in cache 125 based on a hash of the second request URL and/or other lookup. Dynamic caching server 120 may also determine (at 7) that the performance of cache 125 no longer satisfies the performance threshold. For instance, the cache miss that resulted from the first request for the first content may have reduced the cumulative cache-hit ratio of dynamic caching server 120 below a specified amount, may have resulted in a response latency that is greater than a specified amount, and/or may have resulted in a certain percentage of requests being cache misses.

The poor cache performance (e.g., cache performance not satisfying the performance threshold) may trigger the dynamic changing of the first caching policy by dynamic caching server 120. In FIG. 1, dynamic caching server 120 replaces (at 7) the first caching policy with a different second caching policy.

In some embodiments, dynamic caching server 120 may be configured with a set of caching policies, and each caching policy may provide optimal cache performance for different demand (e.g., different requested content, different request patterns, and/or other shifts in the content that is requested from dynamic caching server 120). Accordingly, dynamic caching server 120 may select the second caching policy to replace the first caching policy based on cache performance metrics that need improvement and/or current and past demand that caused the change in the cache performance metrics.

In some embodiments, the demand may be determined from tracking content that is requested by client devices 110 over a period of time and/or content in cache 125. For instance, dynamic caching server 120 may select the second caching policy, to replace the first caching policy, when the request history is primarily directed to a first type of content (e.g., streaming content), and may select a third caching policy, to replace the first caching policy, when the request history is primarily directed to a second type of content (e.g., webpages, images, and/or text). In this example, the second caching policy may improve cache performance of dynamic caching server 120 better than the first caching policy or the third caching policy when dynamic caching server 120 primarily receives requests for the first type of content. The second caching policy may be a selective caching policy that prioritizes caching of the first type of content while deprioritizing caching of other content types. As another example, if the first caching policy is a second-hit caching policy and second-hit caching results in too low of a cache-hit ratio, dynamic caching server 120 may replace the first caching policy with a second caching policy for first-hit caching. Alternatively, if the first caching policy is a second-hit caching policy and second-hit caching results in an overly high percentage of cached files that are not later requested while in cache 125, then dynamic caching server 120 may replace the first caching policy with a second caching policy for fourth-hit caching so that the most popular content is stored to cache 125 while less popular content (e.g., content that is requested less than four times in a given interval) is not cached.

Dynamic caching server 120 may request (at 8) and receive (at 9) the second content from origin storage 130. Using the second caching policy, instead of the first caching policy, and/or information about the received (at 9) second content, dynamic caching server 120 determines (at 10) whether to store the retrieved second content in cache 125 while, simultaneously or contemporaneously, distributing (at 10') the second content to requesting client devices 110. The second caching policy may use a different second set of conditions than the first caching policy to determine whether the second content should be locally cached. In other words, the basis for caching the second content is different than the basis for caching the first content. For instance, the first caching policy may be a second-hit caching policy, and the second caching policy may be a selective caching policy that may cache certain file types and/or file sizes (e.g. less than 500 megabytes ("MB")) while excluding other file types and/or file sizes (e.g., greater than 500 MB) from cache 125.

Dynamic caching server 120 may also improve cache performance by dynamically modifying the purging policy, in addition to or instead of modifying the caching policy. Dynamic caching server 120 may use the purging policy to determine which cached content to remove from cache 125 when utilization of cache 125 exceeds a usage threshold and/or additional space is needed in cache 125 for caching of new content.

Figure 2:
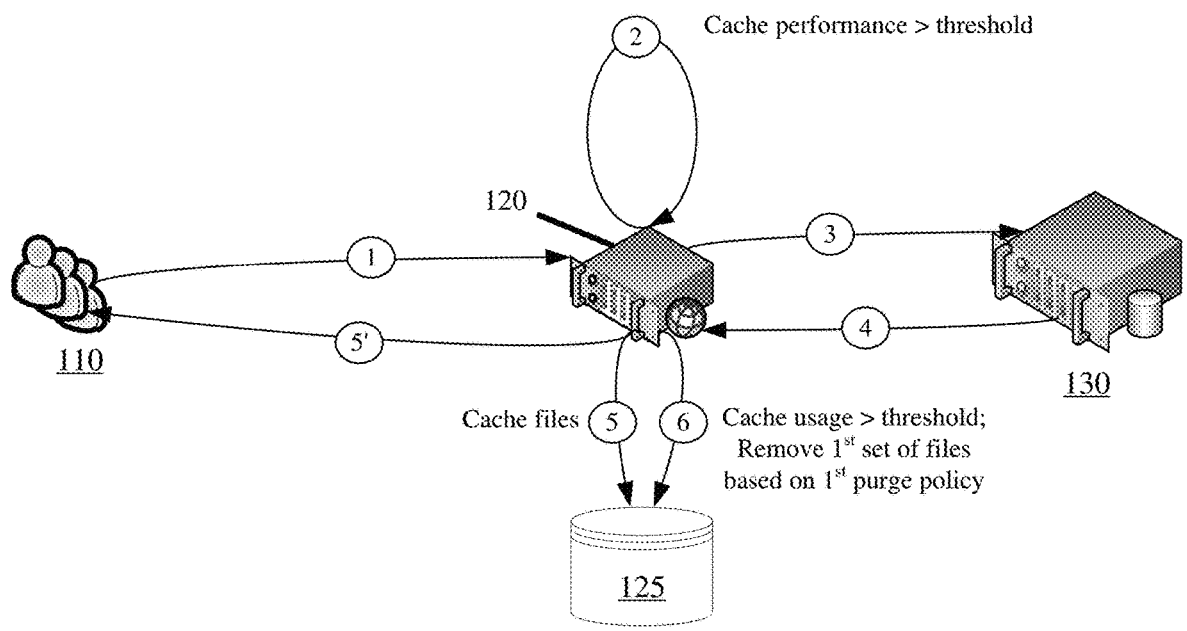
FIG. 2 illustrates an example for dynamically modifying the purging policy of a caching server in accordance with some embodiments described herein.
Figure 2:
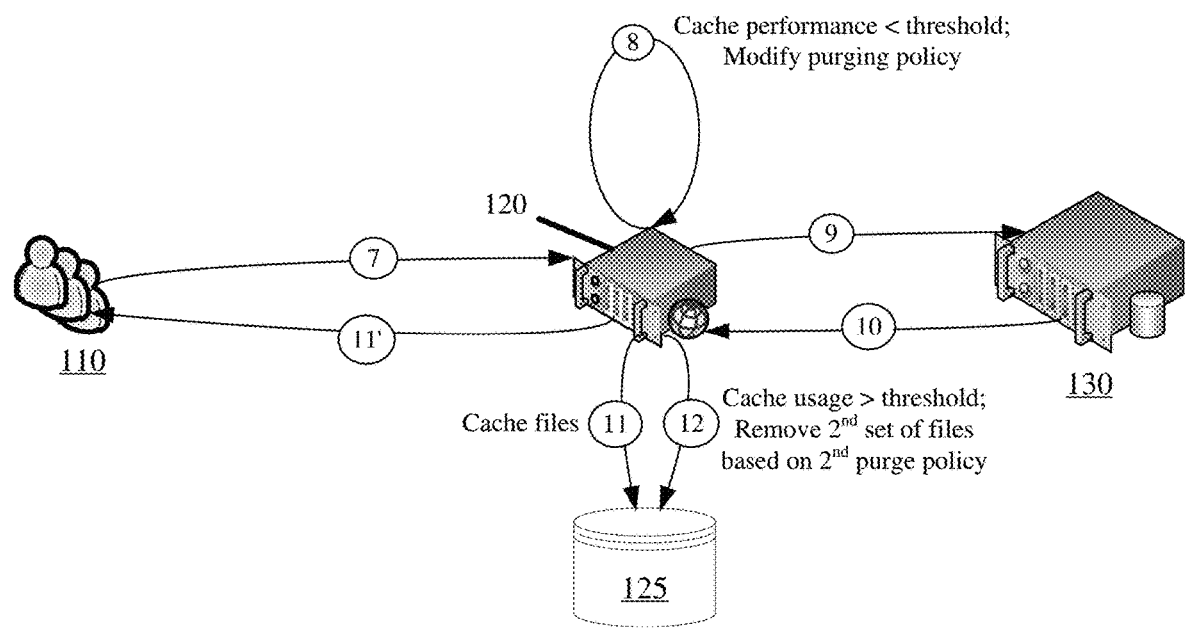

FIG. 2 illustrates an example for dynamically modifying the purging policy of a caching server in accordance with some embodiments described herein. In FIG. 2, dynamic caching server 120 may receive (at 1) a first request for first content from client devices 110. Dynamic caching server 120 may determine that the first content is not locally stored in cache 125, and may further determine (at 2) that the cache performance satisfies a performance threshold. Accordingly, no change is made to the caching and/or purging behavior of dynamic caching server 120.

Dynamic caching server 120 may forward (at 3) a request for the first content to origin storage 130. Origin storage 130 may provide (at 4) the first content to dynamic caching server 120 in response to the forwarded (at 3) request.

Dynamic caching server 120 may determine (at 5) whether to enter the first content in cache 125 based on a current caching policy, and may distribute (at 5') the first content to a requesting client device 110. Entering the first content into cache 125 may result in cache 125 usage that exceeds a usage threshold. Accordingly, dynamic caching server 120 may use (at 6) a first purging policy to remove a first set of files from cache 125, and bring cache usage below the usage threshold.

Dynamic caching server 120 may receive (at 7) a second request for second content from client devices 110. Dynamic caching server 120 may determine that the second content is not locally stored in cache 125, and may further determine (at 8) that the cache performance no longer satisfies the performance threshold.

The reduced cache performance may trigger the dynamic changing of the purging behavior in part because the first purging policy may contribute to the reduced cache performance. For instance, in removing (at 6) the first set of files based on the first purging policy, dynamic caching server 120 may have removed files that were of particular importance to the current set of requests received by dynamic caching server 120. Accordingly, dynamic caching server 120 may modify (at 8) the purging policy that is used to remove content from cache 125.

In FIG. 2, dynamic caching server 120 may replace the first purging policy with a different second purging policy. In some embodiments, dynamic caching server 120 may be configured with a set of purging policies, and may select the second purging policy to replace the first purging policy based on monitored cache metrics and/or current and/or past demand.

Dynamic caching server 120 may monitor the cache metrics and/or demand based on requests issued by client devices 110 over time and/or content that is retrieved and/or entered into cache 125 in response to the requests, and may select the second purging policy based on the tracked information. For instance, dynamic caching server 120 may select the second purging policy, to replace the first purging policy, when the request history is primarily directed to a first type of content (e.g., streaming content), and may select a third purging policy, to replace the first purging policy, when the request history is primarily directed to a second type of content (e.g., webpages, images, and/or text). In this example, the first purging policy may be an LRU purging policy that ages cached content based on the recency of the last request for that content. The second purging policy may be a modified LRU purging policy that slows the aging of cached content that is of the first type relative to cached content of other types. As another example, the first purging policy may age cached content equally based on time in cache, whereas the second purging policy may age cached content differently based on content size. Both purging policies may then select and remove the content with the greatest age from cache 125 with the first and second caching policies resulting in different removals.

Dynamic caching server 120 may request (at 9) and receive (at 10) the second content from origin storage 130. Dynamic caching server 120 determines (at 11) whether to store the retrieved second content in cache 125 while also distributing (at 11') the second content to client devices 110.

Dynamic caching server 120 may also determine (at 12) that cache usage exceeds the usage threshold. Accordingly, dynamic caching server 120 may use (at 12) the second purging policy to remove a second set of files from cache 125, and thereby bring cache usage below the usage threshold. The first purging policy may use a first set of criteria to select content in cache 125 to remove, while the second purging policy may use a different second set of criteria to select different content in cache 125 to remove.

In some embodiments, modifying the caching and/or purging policies of dynamic caching server 120 may include gradually adjusting parameters that are related to the conditions controlling caching behavior of a configured caching policy and/or the conditions controlling purging behavior of a configured purging policy. Each adjusted parameter may result in an incremental change to the caching and/or purging behavior of dynamic caching server 120.

In some embodiments, dynamic caching server 120 may be configured with probabilistic caching and/or purging policies. The probabilistic policies do not treat all content the same. Instead, the probabilistic policies provide different probabilities with which different content is entered to cache 125 and/or is evicted from cache 125. For instance, a static non-probabilistic second-hit caching policy will cache content if it is requested twice within a given interval regardless of the type, size, content provider, etc. Conversely, a dynamic probabilistic second-hit caching policy may cache content having a first set of characteristics with a first probability (e.g., 80%) after a second request in the given interval, and may cache content having a second set of characteristics with a different probability (e.g., 25%) after a second request in the given interval. In other words, there are different likelihoods that different content is entered into cache 125 after two requests in a given interval when caching behavior is determined by a dynamic probabilistic second-hit caching policy.

The characteristics affecting the probabilistic caching and/or purging policies may include type (e.g., streaming, text, audio, video, image, etc.), size, file extension, originating content provider, origin storage 130 retrieval latency, and/or other content attributes. The probabilistic caching and/or purging policies may also account for attributes of requesting client devices 110. For instance, first content retrieved in response to a first request from a client device identified via a first user agent may be cached with a lower probability because of the first user agent than second content retrieved in response to a second request from a client device identified via a different second user agent.

Figure 3A:
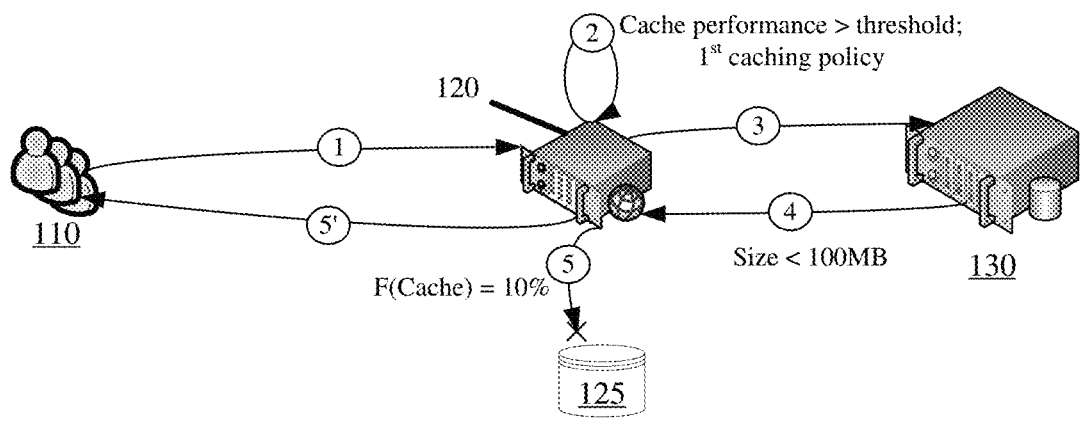
FIGS. 3A, 3B, and 3C illustrate examples of a dynamic caching server adjusting parameters of a probabilistic caching policy in order to improve cache performance in accordance with some embodiments described herein.
Figure 3B:
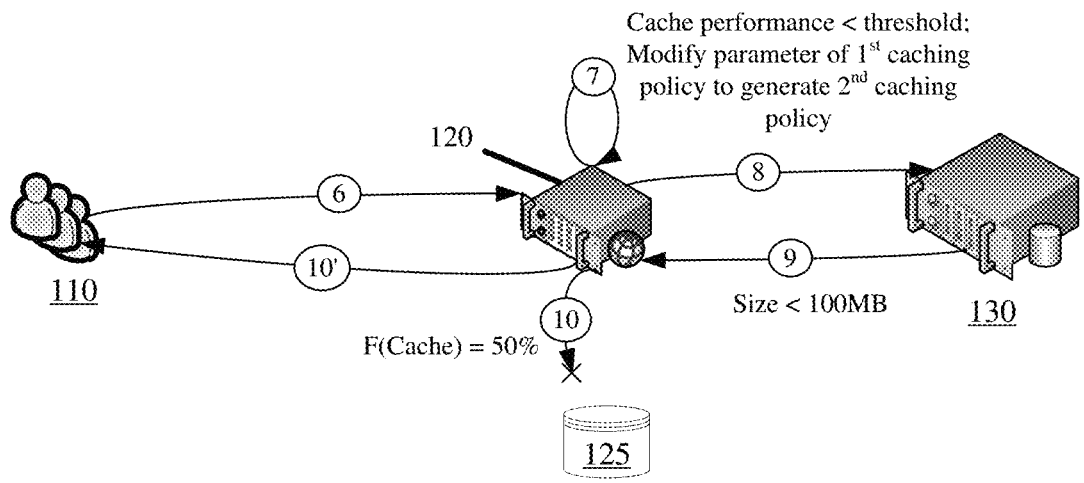
Figure 3C:
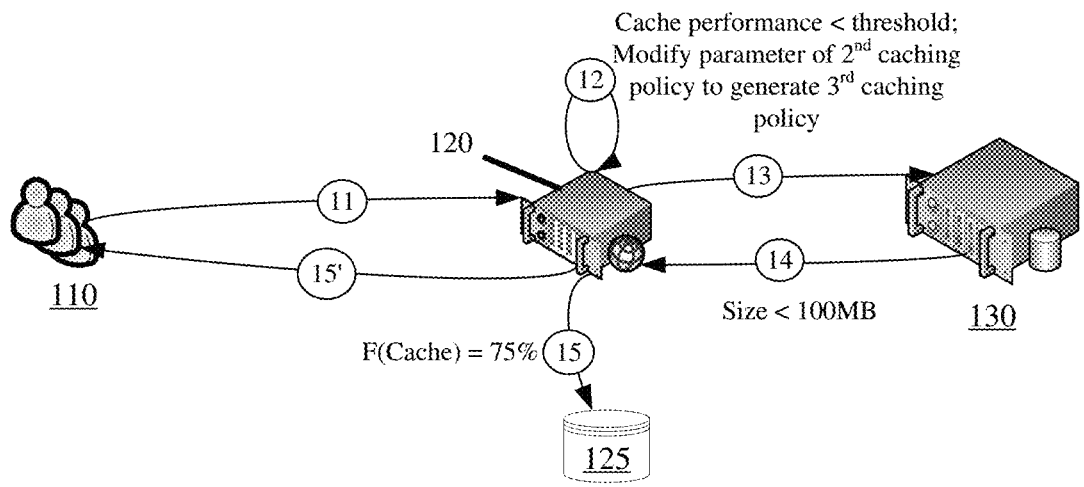

Dynamic caching server 120 automatically adjusts the parameters for the probabilistic caching and/or purging policies to minimize the number of deferrals (e.g., the number of requested and retrieved content that is not cached) while maximizing resource usage and cache utilization. FIGS. 3A, 3B, and 3C illustrate examples of dynamic caching server 120 adjusting parameters of a probabilistic caching policy in order to improve cache performance in accordance with some embodiments described herein.

FIG. 3A illustrates dynamic caching server 120 receiving (at 1) a first request for particular content from client devices 110. Dynamic caching server 120 may determine that the particular content is not in cache 125, and may further determine (at 2) that cache performance satisfies a performance threshold. Accordingly, dynamic caching server 120 does not modify a currently selected first size-based probabilistic caching policy (e.g., a caching policy that changes the probability that content is entered to cache 125 based on the content size).

In response to the cache miss, dynamic caching server 120 may request (at 3) and retrieve (at 4) the particular content from origin storage 130. In retrieving (at 4) the particular content, dynamic caching server 120 may obtain various characteristics of the particular content. For instance, dynamic caching server 120 may obtain the size of the particular content. Dynamic caching server 120 may determine (at 5) whether to store the particular content in cache 125 based on the size-based probabilistic caching policy and the particular content size.

As shown in FIG. 3A, the particular content has a size less than 100 MB, and the first size-based probabilistic caching policy caches 10% of content having a size less than 100 MB. In FIG. 3A, the particular content is not cached (e.g., not copied to cache 125) (at 5), and is distributed (at 5') to a requesting client device 110 after retrieval (at 4) from origin storage 130. The first size-based probabilistic caching policy may prioritize the caching of larger files because of greater latency associated with retrieving larger files, higher request volume for larger files, content providers paying more for delivery of larger files, and/or other cache performance reasons that allow dynamic caching server 120 to have cache performance in satisfaction of the performance threshold.

FIG. 3B illustrates dynamic caching server 120 receiving (at 6) a second request for the same particular content from client devices 110. Dynamic caching server 120 determines that the particular content is not in cache 125 based in part on the caching deferral (at 5) in FIG. 3A. Dynamic caching server 120 also determines (at 7) that cache performance no longer satisfies the performance threshold, and therefore modifies the size-based probabilistic caching policy that is used to enter content in cache 125.

In FIG. 3B, modifying the size-based probabilistic caching policy may include producing a second size-based caching policy that is based on, but different than the first size-based caching policy. In FIG. 3B, dynamic caching server 120 modifies one or more parameters of the size-based probabilistic caching policy used in FIG. 3A. Dynamic caching server 120 may modify the parameters of the caching policy to adjust the caching policy for changes in the request volume, requested content, cached content, and/or other factors that may have caused the cache performance to degrade as a result of the previous caching policy (e.g., the first size-based probabilistic caching policy used in FIG. 3A).

Dynamic caching server 120 requests (at 8) and retrieves (at 9) the particular content from origin storage 130. Here again, dynamic caching server 120 obtains various characteristics of the particular content, including, for example, that the particular content size is less than 100 MB in size. Dynamic caching server 120 then uses the second size-based probabilistic caching policy (e.g., the modified first size-based probabilistic caching policy) to determine (at 10) whether to store the particular content in cache 125.

In FIG. 3B, dynamic caching server 120 dynamically modifies the size-based probabilistic caching policy to cache 50% of content having a size less than 100 MB, whereas the unmodified or first size-based probabilistic caching policy shown in FIG. 3A caches 10% of content having a size less than 100 MB. In FIG. 3B, the 50% probability still results in a cache deferral. Accordingly, dynamic caching server 120 distributes (at 10') the particular content to a requesting client device 110 without entering (at 10) a copy of the particular content to cache 125.

FIG. 3C illustrates dynamic caching server 120 receiving (at 11) a third request for the same particular content from client devices 110. Dynamic caching server 120 determines that the particular content is not in cache 125 based in part on the cache deferral (at 10) in FIG. 3B. Dynamic caching server 120 also determines (at 12) that cache performance still does not satisfy the performance threshold, and therefore modifies the second size-based probabilistic caching policy to generate a third size-based probabilistic caching policy.

After requesting (at 13) and retrieving (at 14) the particular content from origin storage 130 yet again, dynamic caching server 120 determines (at 15) whether to store the particular content in cache 125 using the third size-based probabilistic caching policy. In FIG. 3C, dynamic caching server 120 dynamically modifies the size-based probabilistic caching policy to cache 75% of content having a size less than 100 MB, whereas the second size-based probabilistic caching policy shown in FIG. 3B caches 50% of content having a size less than 100 MB, and the first size-based probabilistic caching policy shown in FIG. 3A caches 10% of content having a size less than 100 MB. Consequently, in FIG. 3C, dynamic caching server 120 enters (at 15) a copy of the particular content into cache 125, and distributes (at 15') the particular content to a requesting client device 110.

As shown in FIGS. 3A-3C, the dynamic caching policy used by dynamic caching server 120 changes how the same content is stored to cache at different times or in response to different request for the same content. In these figures, dynamic caching server 120 may change the caching policy in order to increase the number of small sized content (e.g., content with sizes less than 100 MB) that is cached (e.g., entered in cache 125). The caching policy change may be due to a change in the request stream received by dynamic caching server 120, a change in temporally popular content, time-of-day changes, and/or other changes that affect what content is requested from dynamic caching server 120, and therefore affect the cache performance of dynamic caching server 120. In this example, cache performance is affected by the shift in the requested content because content (e.g., large sized content) in cache 125 is being used and/or requested less frequently while other content (e.g., small sized content) not in cache 125 is being used and/or requested more frequently.

FIGS. 3A-3C may be adapted for dynamically modifying the purging policy of dynamic caching server 120. For instance, in order to further prioritize the caching of small sized content (e.g., content with sizes less than 100 MB), dynamic caching server 120 may dynamically modify a purging policy to accelerate the removal of large sized content (e.g., content with sizes greater than 100 MB) from cache 125 while slowing the removal of small sized content from cache 125. In particular, dynamic caching server 120 may modify the probabilities that different content will be evicted from cache.

Dynamic caching server 120 may use machine learning and/or artificial intelligence to automatically determine shifts in demand and/or cache usage, and to dynamically modify the caching policy and/or purging policy so as to maintain optimal cache performance despite the shifts in demand and/or cache usage. The dynamic modification of the caching and/or purging policies may be conditioned on the request stream (e.g., requests issued by client devices 110), the content that is retrieved from origin storage 130 and/or stored in cache 125, demand, time-of-day, and/or factors that potentially impact the cache performance. Accordingly, dynamic caching server 120 may monitor these and other parameters in addition to cache metrics in order to determine when to change the policies and what changes improve cache performance.

Figure 4:
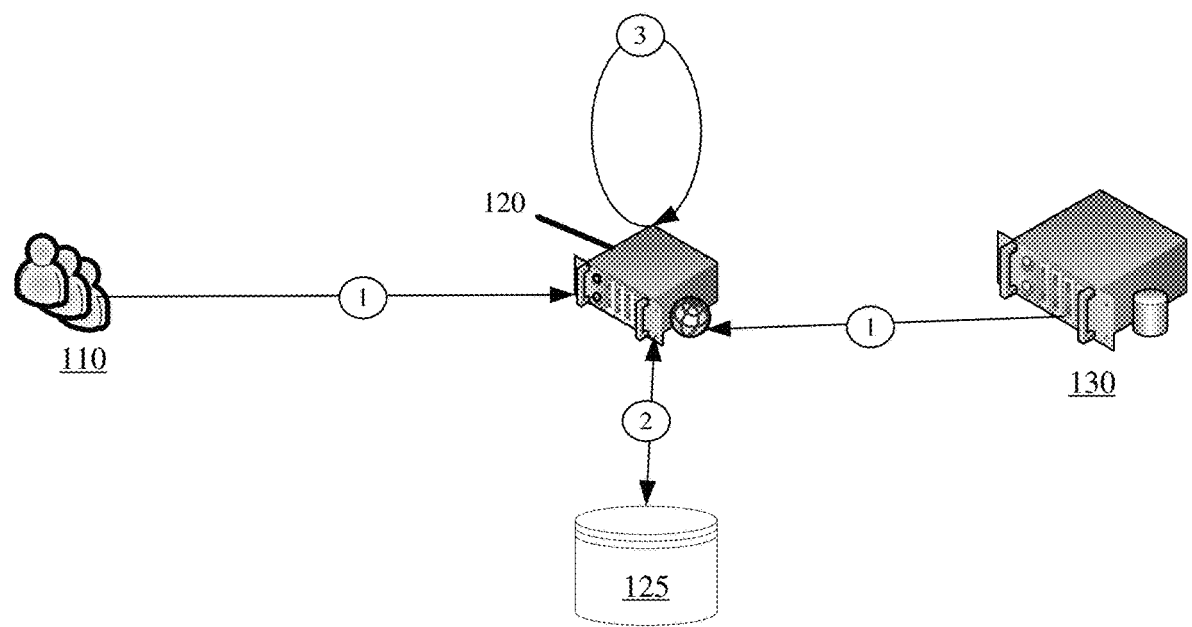
FIG. 4 conceptually illustrates a dynamic caching server dynamically modifying caching and/or purging policies based on real-time and/or historical tracking of requests from client devices and/or cache metrics in accordance with some embodiments described herein.

FIG. 4 conceptually illustrates dynamic caching server 120 dynamically modifying caching and/or purging policies based on real-time and/or historical tracking of requests from client devices 110 and/or cache metrics in accordance with some embodiments described herein. Dynamic caching server 120 may be one of many caching servers that form a CDN or at least a point-of-presence ("PoP") of the CDN, and may therefore be tasked with distribution of a variety of content from the same or different content providers.

As shown, dynamic caching server 120 may monitor (at 1) demand for different content based on requests that are issued by different client devices 110. For instance, dynamic caching server 120 may obtain the URL of each request in order to identify a content provider, a file type (e.g., file extension), and/or other characteristics about the requested content. In some embodiments, dynamic caching server 120 may monitor retrievals from one or more origin storages 130 in order to obtain additional information about the requested content that cannot be obtained from the request alone. For instance, dynamic caching server 120 may determine the size of each requested content, the latency to retrieve the requested content from a remote origin storage (e.g., origin storage 130), and/or other characteristics.

Dynamic caching server 120 may track the demand and the characteristics associated with the demand in a local database or table. In some embodiments, a set of dynamic caching servers, that are collocated or that interoperate in a CDN PoP, may enter all tracking information into a common database or table that can be accessed by any caching server in the set of dynamic caching servers. From the real-time and/or historical tracking, dynamic caching server 120 may determine when certain content is in demand and should be prioritized in cache 125, and/or characteristics of the demanded content that should be prioritized when dynamically modifying the caching and/or purging policies. In some embodiments, the collective set of tracking information entered into the common database or table can be used to defined one or more meta-policies, or caching and/or purging policies, that each caching server of the set of dynamic caching servers executes at the same time.

As shown in FIG. 4, dynamic caching server 120 may also monitor (at 2) metrics that are related to the performance and/or health of cache 125. For instance, dynamic caching server 120 may monitor the cache-hit ratio, byte-hit rate, health of cached content (e.g., number of times content is served from cache, file age, popularity, etc.), total throughput, the number of cache deferrals (e.g., retrieved content that is not cached), cache misses, origin retrievals, cache utilization, average response latency, distribution of content in cache (e.g., number of content providers with content in cache 125), and/or other parameters related to the percentage of retrieved content that is cached and/or the speed with which the caching servers can respond to client requests.

Dynamic caching server 120 may use the monitored (at 1 and 2) information to dynamically modify (at 3) the caching policies used to enter content in cache, and the purging policies used to remove content from cache. In some embodiments, dynamic caching server 120 may be programmed with or may use machine learning to determine different caching and/or purging policy changes that improve cache performance relative to the characteristics that are in demand. For instance, increasing the probability of caching small sized content is effective in improving cache performance when demand for small sized content increases, whereas increasing the probability of caching large sized content is effective in improving cache performance when demand for large sized content increases. Similarly, changing from second-hit caching to fourth-hit caching may improve cache performance when a large set of files are routinely requested.

Figure 5:
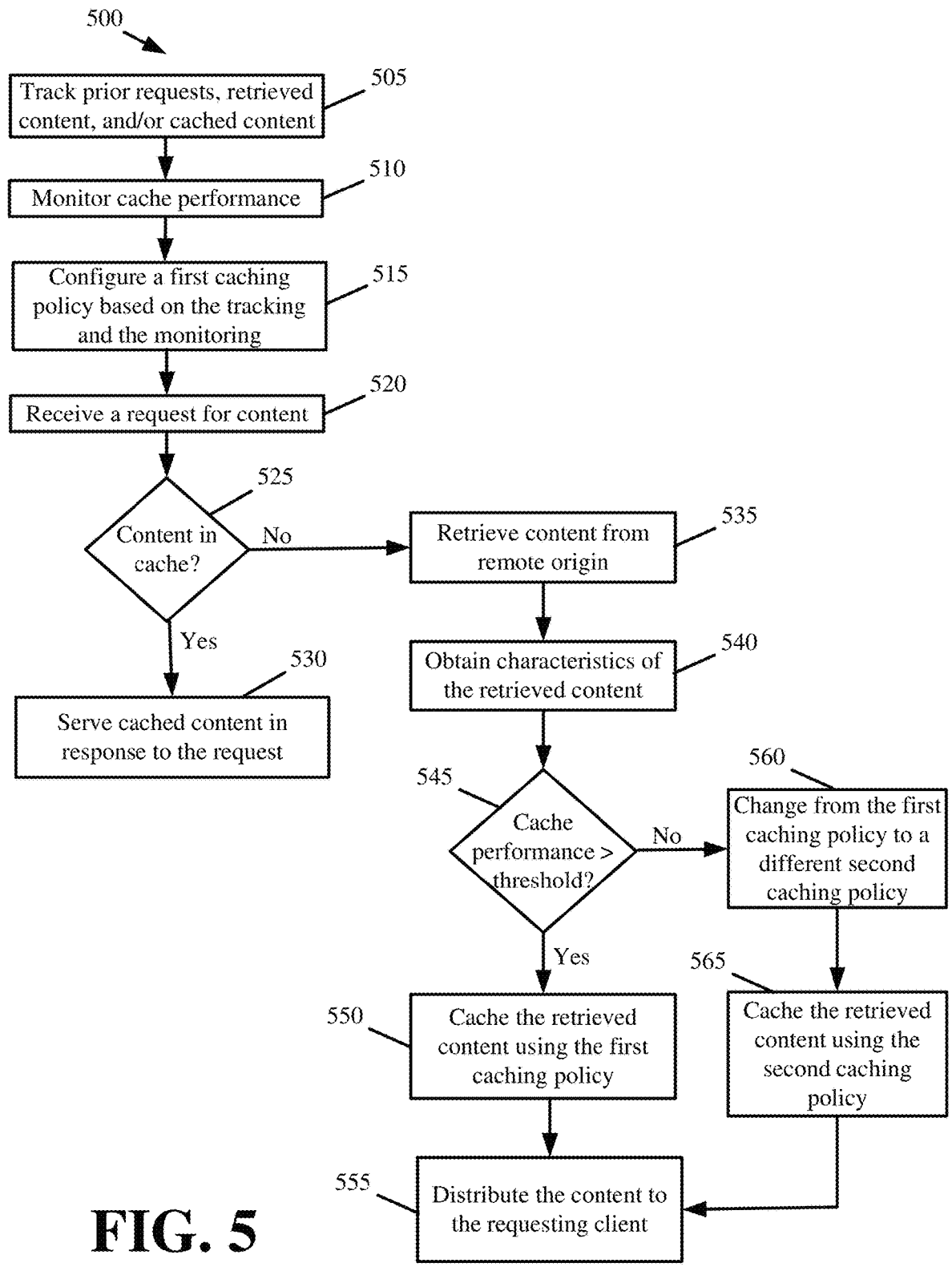
FIG. 5 present a process for adjusting a dynamic caching policy in accordance with some embodiments described herein.

FIG. 5 present a process 500 for adjusting a dynamic caching policy in accordance with some embodiments described herein. Process 500 may be implemented by dynamic caching server 120 and/or any device that responds to requests for content from client devices 110 by serving locally cached copies of the requested content from a local cache, and by retrieving and serving requested content that is not cached from one or more remote and network accessible sources (e.g., remote origin 130).

Process 500 may include tracking (at 505) a set of prior requests, retrieved content, and/or cached content. Process 500 may further include monitoring (at 510) cache performance. Cache performance may be derived from one or more metrics that are related to the health and/or performance of the cache, and that are compared against preconfigured or dynamic performance thresholds. For instance, a performance threshold may specify a 90% cache-hit ratio, and cache performance may satisfy the performance threshold when the monitored cache-hit ratio meets or exceeds the 90% performance threshold, and does not satisfy the performance threshold when the monitored cache-hit ratio is less than the 90% performance threshold. As another example, the performance threshold may specify a 90% cache-hit ratio and a cache deferral rate that is less than 20% of requested content.

Process 500 may include configuring (at 515) the dynamic caching server with a first caching policy that maximizes one or more metrics related to cache performance based on the tracking (at 505) and the monitoring (at 510). For instance, the dynamic caching server may select a first caching policy from a set of caching policies that maximizes the cache-hit ratio and/or minimizes the number of cache deferrals for the prior set of requests, retrieved content, and/or cached content.

Process 500 may include receiving (at 520) a request for content. In response to receiving (at 520) the request, process 500 may include determining (at 525) if a copy of the requested content is in local cache (e.g., memory and/or storage of the device receiving the request). In some embodiments, the device may extract and hash a URL of the request, and use the hash result to identify, from a bloom filter or other tracking table, whether the requested content is in cache.

In response to determining (at 525—Yes) that the requested content is in cache, process 500 may include serving (at 530) the cached copy of the requested content to the requesting client device. In response to determining (at 525—No) that the requested content is not in cache, process 500 may include retrieving (at 535) the requested content from a remote origin storage. The remote origin storage may be a second-tier caching and/or storage device in a multi-tier caching platform or CDN. The remote origin storage may also be a device of a content originator or content provider that is remotely accessible via a data network (e.g., the Internet).

Process 500 may include obtaining (at 540) characteristics of the retrieved content. For instance, the dynamic caching server may obtain the size of the content, the latency for retrieving the content, an encoding, a resolution, metadata, and/or other attributes of the content.

Process 500 may include determining (at 545) if the monitored (at 510) cache performance satisfies a performance threshold. In some embodiments, the determination (at 545) may be based on two or more thresholds. For instance, cache performance may not satisfy an overall performance threshold when the monitored cache-hit ratio meets or exceeds a desired cache-hit threshold, but the latency associated with retrieving the content is greater than a maximum latency threshold.

In response to determining (at 545—Yes) that the cache performance satisfies the performance threshold, process 500 may include determining (at 550) whether to cache the retrieved content using the configured first caching policy. The first caching policy may use a first set of conditions to determine whether the retrieved content should be entered into the cache, or whether to perform a cache deferral and serve the retrieved content without caching. The first set of conditions controlling the caching decisions may be based on one or more of the prior request history of the requested content (e.g., requested two or more times in a time interval), various characteristics of the retrieved content (e.g., content size, type, latency, etc.), and/or cache performance or health metrics. Process 500 may then distribute (at 555) the content to the requesting client.

In response to determining (at 545—No) that the cache performance does not satisfy the performance threshold, process 500 may include changing (at 560) from the current first caching policy to a different second caching policy. In some embodiments, changing (at 560) the first caching policy may include switching from the first caching policy to the different second caching policy (e.g., second-hit caching to selective caching). In some embodiments, changing (at 560) the first caching policy may include adjusting one or more conditions of the first caching policy to modify the caching behavior of the first caching policy and to produce the second caching policy.

Changing from the first caching policy to the second caching policy may be based on the tracked (at 505) request history and/or monitored (at 510) cache performance. For instance, the request history may provide indicators as to changing request patterns, and caching policy changes that can improve the cache performance in light of the changing request patterns. Consequently, a first change may be made to the first caching policy when the request history reveals that there is increased demand for a first type or first set of content (e.g., streaming content), and a different second change may be made to the first caching policy when the request history reveals that there is increased demand for a different second type or second set of content (e.g., small size static content). As another example, the dynamic caching server may determine, from the monitored cache performance, that the cache-hit ratio has declined because content with at least one common characteristic is given a very low caching probability by the first caching policy. Accordingly, changing the first caching policy may include changing a parameter of the first caching policy based on the monitored cache performance to increase the caching probability for content with the at least one common characteristic.

The second caching policy may use a second set of conditions, that are different than the first set of conditions of the first caching policy, to determine (at 565) whether the retrieved content should be entered into the cache, or whether to perform a cache deferral and serve the retrieved content without caching. Process 500 may then include distributing (at 555) the content to the requesting client.

Process 500 may also be used to dynamically modify the purging policy that is used by the dynamic caching server to remove cached content from cache. For instance, when the cache performance does not satisfy one or more performance thresholds, process 500 may be adapted to change from a first purging policy to a different second purging policy. In this case, the decrease in cache performance may be partly due to the purging policy retaining a first set of content in cache that is rarely accessed, and evicting a second set of content from cache that is more frequently accessed, wherein the first set of content has at least a first common characteristic (e.g., content type, file extension, file size, encoding, resolution, and/or other attributes) and the second set of content has at least a different second common characteristic. To improve cache performance, the dynamic caching server may change from the first purging policy to a second purging policy that assigns a high eviction probability to the first set of content (e.g., content with at least the second common characteristic), thereby causing the infrequently accessed first set of content to be removed from cache while deprioritizing and retaining in cache other more frequently accessed content.

Figure 6:
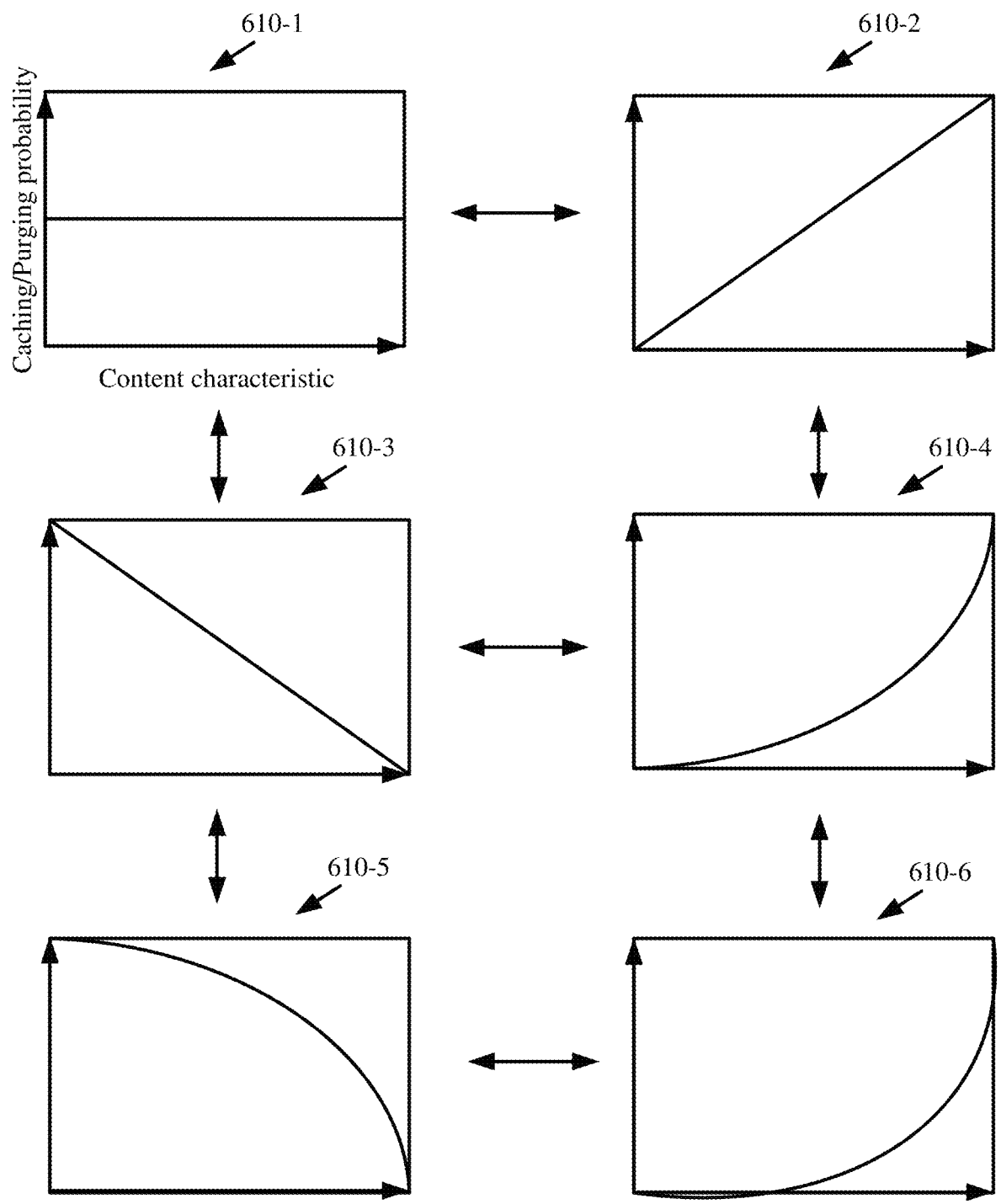
FIG. 6 conceptually illustrates changing caching and/or purging policies for a dynamic caching server in accordance with some embodiments described herein.

FIG. 6 conceptually illustrates changing caching and/or purging policies for a dynamic caching server in accordance with some embodiments described herein. FIG. 6 includes graphical representations for different caching and/or purging policies 610-1, 610-2, 610-3, 610-4, 610-5, and 610-6 (herein sometimes collectively referred to as "policies 610" or individually as "policy 610").

The x-axis for each policy 610 may represent one or more content characteristics on which a caching and/or purging decision is based. A similar set of graphical representations may be generated to represent caching and/or purging policies for different sets of content characteristics. For instance, the x-axis for the set of policies 610 illustrated in FIG. 6 may represent content size, and the x-axis for a another set of policies may represent content type. In this manner, each set of policies 610 may be used to optimize cache performance based on a different observed common characteristic in the content requested by client devices 110 (e.g., the demand).

The y-axis of each policy 610 may represent a caching and/or purging probability that is assigned based on the one or more characteristics of the content. The higher the caching probability, the higher the likelihood that requested and/or retrieved content will be entered into cache. For instance, a caching policy may provide an 80% likelihood to cache a particular file by generating a random number between 1-10, and if the generated number is between 1-8 then the particular file is cached (e.g., 80% caching probability).

As shown, a first policy (e.g., policy 610-1), such as a second-hit caching policy, may treat all content the same, whereas second policies (e.g., policies 610-2 and 610-3) may prioritize caching and/or purging of content with a particular set of characteristics (e.g., size). The parameters of the policies 610 may then be changed to adjust the probabilities according to desired changes in caching and/or purging behavior. Gradual adjustments to parameters of a caching and/or purging policy may result in an infinite number of caching and/or purging policies that the dynamic caching server can use to change caching and/or purging behavior in real-time.

As noted in the background, caching servers may use a single static caching policy and a single static purging policy when the accessible cache is sufficiently large (e.g., terabytes in size). In such cases, the caching servers may use a permissive caching policy, such as first-hit caching or second-hit caching, to enter most requested content in cache so as to minimize the cache deferral rate without impacting the cache-hit ratio, because the large size cache can cache a large number of content without having to evict previously cached content for a long period of time.

LRU or LFU may be used for a static purging policy to remove content from the sufficiently large cache. For a cache that is sufficiently large in size, the cached content will remain in cache for a sufficiently long period of time before the content, whether popular or unpopular, is selected for eviction.

When the dynamic caching server implementing the dynamic caching and/or purging policies presented herein is used with a sufficiently large cache, the dynamic caching server is unlikely to change the caching and/or purging policies frequently or at all since cache performance is less affected by the policies than by the size of the cache. However, the dynamic caching server implementing the dynamic caching and/or purging policies may provide better cache and/or content delivery performance with a cache that is of a smaller overall size.

A smaller cache can retain less files, which can lead to more frequent cache deferrals and/or content evictions. The smaller size, in conjunction with static policies, may cause more popular files to be evicted from cache sooner than is desired, thereby lowering the cache-hit ratio. Accordingly, some embodiments deploy the dynamic caching server implementing the dynamic caching and/or purging policies in regions and/or devices with a smaller cache footprint.

Figure 7:
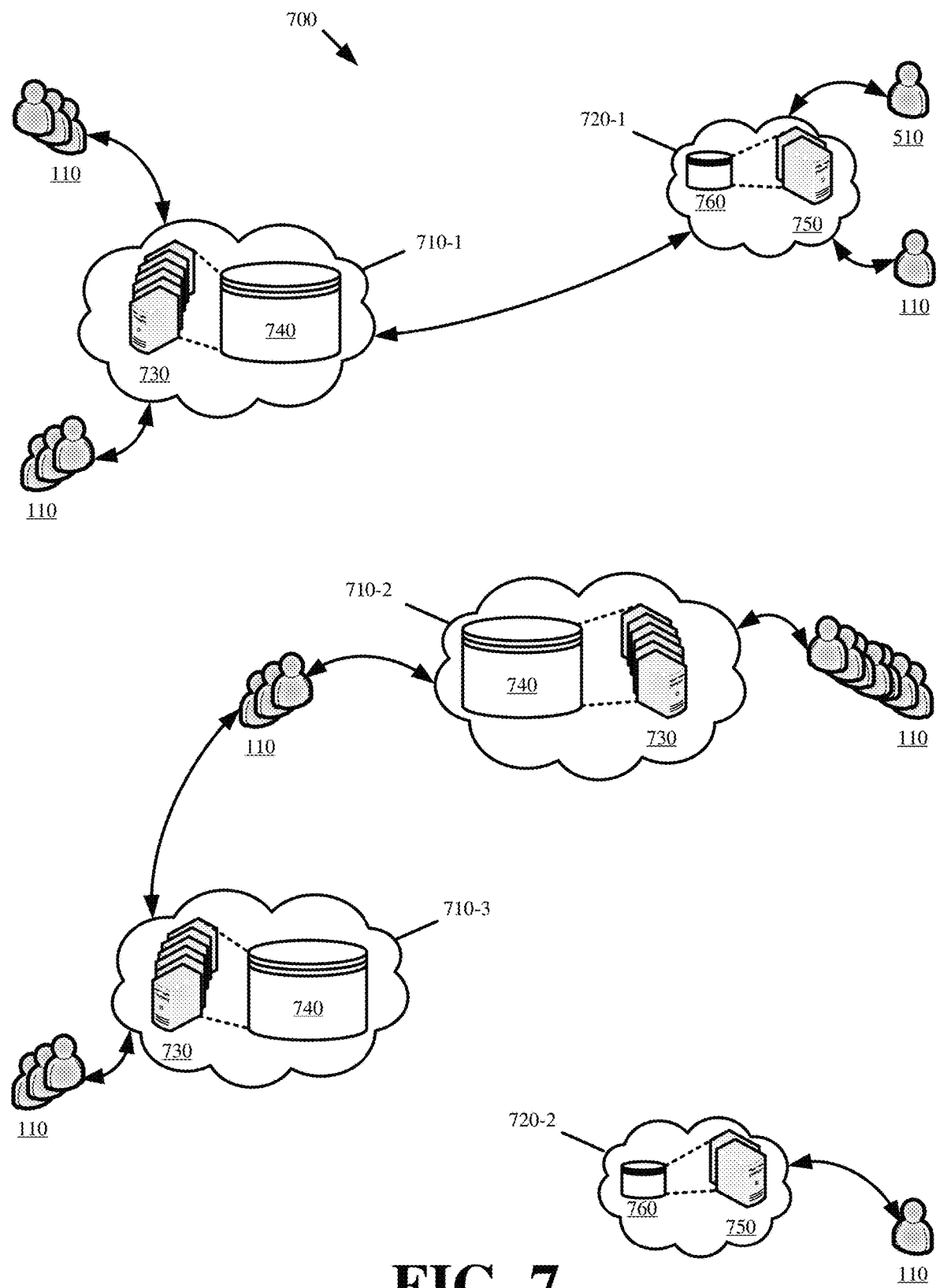
FIG. 7 conceptually illustrates an example content delivery network ("CDN") that utilizes static policies at certain locations and dynamic policies at other locations in accordance with some embodiments presented herein.

FIG. 7 conceptually illustrates example CDN 700 that utilizes static policies at certain locations and dynamic policies at other locations in accordance with some embodiments presented herein. CDN 700 may include super-PoPs 710-1, 710-2, and 710-3 (herein sometimes collectively referred to as "super-PoPs 710" or individually as "super-PoP 710"), and nano-PoPs 720-1 and 720-2 (herein sometimes collectively referred to as "nano-PoPs 720" or individually as "nano-PoP 720"). CDN 700 may be a "cloud" platform or a distributed platform that distributes different content to client devices 110 at different geographic and/or network locations via a data network, such as the Internet.

Super-PoPs 710 may be deployed to high demand regions where there are many client devices 110 that request content from CDN 700. A super-PoP 710 is formed by several caching servers 730 that collectively provide large cache 740. Each caching server 730 may cache a different subset of the overall content that is cached in respective of large cache 740 at the super-PoP 710 so as to avoid redundant caching of the same content. Caching servers 730 in a super-PoP 710 may therefore operate using static caching and/or purging policies, or the dynamic caching and/or purging policies set forth herein.

Nano-PoPs 720 may be deployed to low demand regions where there are less client devices 110 that request content from CDN 700. For instance, nano-PoPs 720 may be deployed to developing countries or to regions that experience high latency from the closest super-PoP 710, but have network usage that does not justify a closer super-PoP 710 deployment. Nano-PoPs 720 may also be deployed before a super-PoP 710 to a new region that CDN 700 expands into. Over time, each nano-PoP 720 may be expanded to a super-PoP 710.

Nano-PoPs 720 may have fewer caching servers 750 and/or smaller cache 760 than a super-PoP 710. Smaller cache 760 of each nano-PoP 720 allows fewer content to be cached at a nano-PoP 720 relative to a super-PoP 710. As demand and/or popularity shifts, a nano-PoP 720 may be slow to adjust in changing the contents of cache 760, thereby degrading the cache-hit ratio and leading to poor cache performance if managing cache 760 with a single static caching policy and a single static purging policy. Cache 760 may be several orders of magnitude smaller than cache 740. For instance, cache 760 may be less than ten terabytes in size, and cache 740 may be several hundreds of terabytes in size.

Accordingly, in some embodiments, caching servers 750 of nano-PoPs 720 are dynamic caching servers that manage cache 760 with dynamic caching policies and dynamic purging policies that continually change based on changing request behavior. In some embodiments, dynamic caching servers 750 in a particular nano-PoP 720 may operate collectively to share request tracking information and cache performance information. In some such embodiments, dynamic caching servers 750 may synchronize changes that are made to the dynamic caching and/or purging policies.

In some embodiments, one or more super-PoPs 710 may also serve as the origin storage for a nano-PoP 720. For instance, when content is requested from nano-PoP 720-1 and no dynamic caching server 750 in nano-PoP 720-1 has the content in cache, a request for the content may be forwarded from nano-PoP 720-1 to neighboring super-PoP 710-1. Super-PoP, 710-1, because of its larger cache 740, may have the content cached and may provide the content from cache to nano-PoP 720-1. If the content is not cached at super-PoP 710-1, then a caching server 730 of super-PoP 710-1 may retrieve the content from a remote storage of the content provider, and forward the retrieved content to nano-PoP 720-1.

Figure 8:
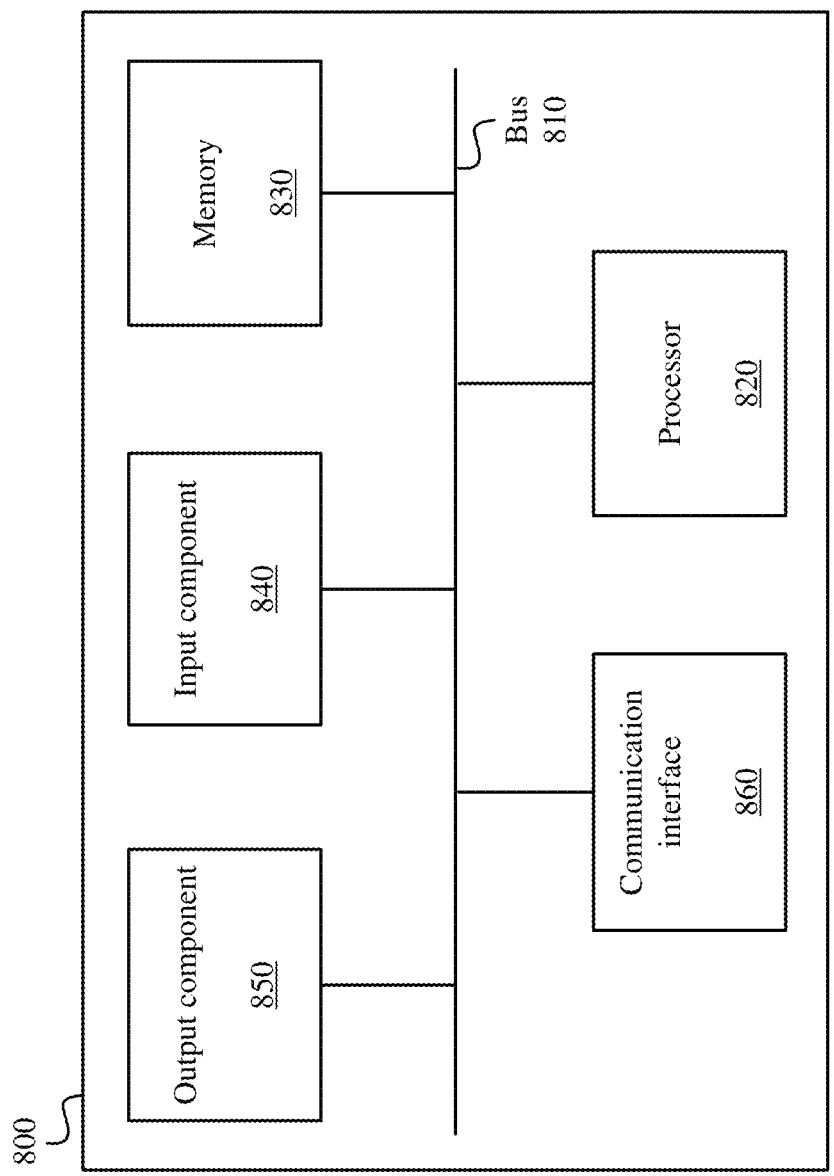
FIG. 8 illustrates a computer system or server with which some embodiments are implemented.

FIG. 8 is a diagram of example components of device 800. Device 800 may be used to implement certain of the devices described above (e.g., client device 110, dynamic caching server 120, cache 125, and/or origin storage 130). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc.

In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
    providing a first cache of a first size at a first site of a content delivery network ("CDN") that receives demand in excess of a threshold amount;
    providing a second cache of a smaller second size at a second site of the CDN that receives demand less than the threshold amount, wherein the second site comprises a plurality of different devices that cache different subsets of files requested from the second site;
    caching a first plurality of files requested from the first site to the first cache based on a static caching policy that remains unchanged in response to changing request behavior;
    caching a second plurality of files requested from the second site to the second cache based on a dynamic caching policy that changes which files are cached in response to changing request behavior, wherein caching the second plurality of files requested from the second site comprises:
        changing from a first caching policy, that each device of the plurality of different devices uses to cache the subsets of the files, to a second caching policy in response to the changing request behavior, and
        wherein the second caching policy prioritizes caching of files with at least one different characteristic than the first caching policy.

2. The method of claim 1, wherein changing from the first caching policy to the second caching policy comprises:
    synchronizing a change from the first caching policy to the second caching policy across the plurality of different devices.

3. The method of claim 1 further comprising:
    receiving a request for particular content at the second site;
    determining that the particular content is not cached at the second site as a result of caching the second plurality of files to the second cache based on the dynamic caching policy;
    transferring the particular content from the first site to the second site in response to the request and determining that the particular content is not cached at the second site; and
    distributing the particular content from the second site after said transferring.

4. The method of claim 1, wherein the first size of the first cache is larger than the second size of the second cache, and wherein the dynamic caching policy caches new content at the second site in fewer requests than the static caching policy at the first site.

5. The method of claim 1, wherein the first size of the first cache is larger than the second size of the second cache, and wherein the dynamic caching policy fills the second cache at a slower rate than the static caching policy fills the first cache.

6. The method of claim 1, wherein the dynamic caching policy differentiates between caching of files with different characteristics, and wherein the static caching policy does not differentiate between caching of files with the different characteristics.

7. The method of claim 6, wherein the different characteristics comprise one or more of a different file type, size, file extension, originating content provider, and retrieval latency.

8. The method of claim 1,
wherein the static caching policy comprises a non-probabilistic caching policy that caches content to the first cache based on a number of times the content is requested from the first site, and
wherein the dynamic caching policy comprises a probabilistic caching policy that caches content to the second cache with different probabilities based on different characteristics of the content.

9. The method of claim 1,
wherein caching the first plurality of files requested from the first site to the first cache based on the static caching policy comprises:
   determining a number of times a particular file is requested from the first site; and
   caching the particular file to the first cache in response to the number of times satisfying a threshold; and
wherein caching the second plurality of files requested from the second site to the second cache based on the dynamic caching policy comprises:
   obtaining one or more characteristics for the particular file at the second site in response to receiving a request for the particular file at the second site; and
   caching the particular file to the second cache based on a probability that is computed for the one or more characteristics using the dynamic caching policy.

10. A system comprising:
a first site that receives demand in excess of a threshold amount, the first site comprising a first cache of a first size and one or more processors configured to:
   cache a first plurality of files requested from the first site to the first cache based on a static caching policy that remains unchanged in response to changing request behavior; and
a second site that receives demand less than the threshold amount, the second site comprising a second cache of a second size and one or more processors configured to:
   cache a second plurality of files requested from the second site to the second cache based on a dynamic caching policy that changes which files are cached in response to changing request behavior, wherein caching the second plurality of files requested from the second site comprises:
      changing from a first caching policy, that each device of a plurality of different devices in the second site uses to cache different subsets of the second plurality of files, to a second caching policy in response to the changing request behavior, and
      wherein the second caching policy prioritizes caching of files with at least one different characteristic than the first caching policy.

11. The system of claim 10, wherein changing from the first caching policy to the second caching policy comprises:
synchronizing a change from the first caching policy to the second caching policy across the plurality of different devices.

12. The system of claim 10, wherein the one or more processors of the second site are further configured to:
receive a request for particular content at the second site;
determine that the particular content is not cached at the second site as a result of caching the files to the second cache based on the dynamic caching policy;
transfer the particular content from the first site to the second site in response to the request and determining that the particular content is not cached at the second site; and
distribute the particular content from the second site after said transferring.

13. The system of claim 10, wherein the dynamic caching policy differentiates between caching of files with different characteristics, and wherein the static caching policy does not differentiate between caching of files with the different characteristics.

14. The system of claim 13, wherein the different characteristics comprise one or more of a different file type, size, file extension, originating content provider, and retrieval latency.

15. A method comprising:
providing a first cache of a first size at a first site of a content delivery network ("CDN") that receives demand in excess of a demand threshold;
providing a second cache of a smaller second size at a second site of the CDN that receives demand less than the demand threshold, wherein the second site comprises a plurality of different devices that cache different subsets of files requested from the second site;
caching a first plurality of files requested from the first site to the first cache based on a static caching policy that remains unchanged in response to changing request behavior; and
caching a second plurality of files requested from the second site to the second cache based on a dynamic caching policy that changes which files are cached in response to changing request behavior, wherein caching the second plurality of files requested from the second site comprises:
   caching a first set of the second plurality of files to the second cache based on the first set of files being selected for caching by a first caching policy set as the dynamic caching policy during a first time;
   determining that a cache-hit ratio of the second cache is less than a performance threshold after the first time;
   replacing the first caching policy with a second caching policy in response to determining that the cache-hit ratio is less than the performance threshold; and
   caching a second set of the second plurality of files to the second cache based on the second set of files being selected for caching by the second caching policy set as the dynamic caching policy during a second time.

16. The method of claim 15 further comprising:
receiving, at the second site, a first request for a particular file that is not cached in the second cache during the first time;
generating a first probability for caching the particular file to the second cache based on the first caching policy being set as the dynamic caching policy during the first time;
receiving, at the second site, a second request for the particular file that is not cached in the second cache during the second time; and
generating a different second probability for caching the particular file to the second cache based on the second caching policy being set as the dynamic caching policy during the second time.

17. A system comprising:
a first site that receives demand in excess of a demand threshold, the first site comprising a first cache of a first size and one or more processors configured to:

cache a first plurality of files requested from the first site to the first cache based on a static caching policy that remains unchanged in response to changing request behavior; and a second site that receives demand less than the demand threshold, the second site comprising a second cache of a second size and one or more processors configured to:

cache a second plurality of files requested from the second site to the second cache based on a dynamic caching policy that changes which files are cached in response to changing request behavior, wherein caching the second plurality of files requested from the second site comprises:

caching a first set of the second plurality of files to the second cache based on the first set of files being selected for caching by a first caching policy set as the dynamic caching policy during a first time;

determining that a cache-hit ratio of the second cache is less than a performance threshold after the first time;

replacing the first caching policy with a second caching policy in response to determining that the cache-hit ratio is less than the performance threshold; and caching a second set of the second plurality of files to the second cache based on the second set of files being selected for caching by the second caching policy set as the dynamic caching policy during a second time.

18. The system of claim 17, wherein the one or more processors of the second site are further configured to:

receive, at the second site, a first request for a particular file that is not cached in the second cache during the first time;

generate a first probability for caching the particular file to the second cache based on the first caching policy being set as the dynamic caching policy during the first time;

receive, at the second site, a second request for the particular file that is not cached in the second cache during the second time; and generate a different second probability for caching the particular file to the second cache based on the second caching policy being set as the dynamic caching policy during the second time.

* * * * *